No. 825,420. PATENTED JULY 10, 1906.
A. M. SAUNDERS.
APPARATUS FOR THE MANUFACTURE OF PIPE.
APPLICATION FILED JAN. 23, 1904.
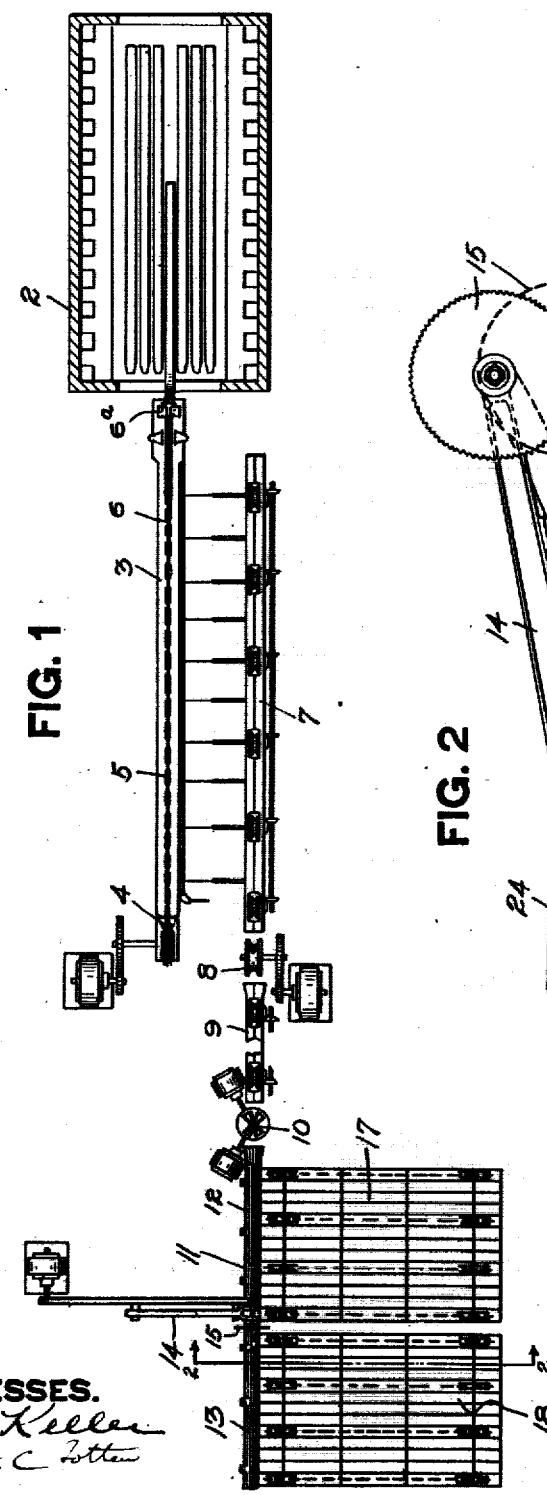
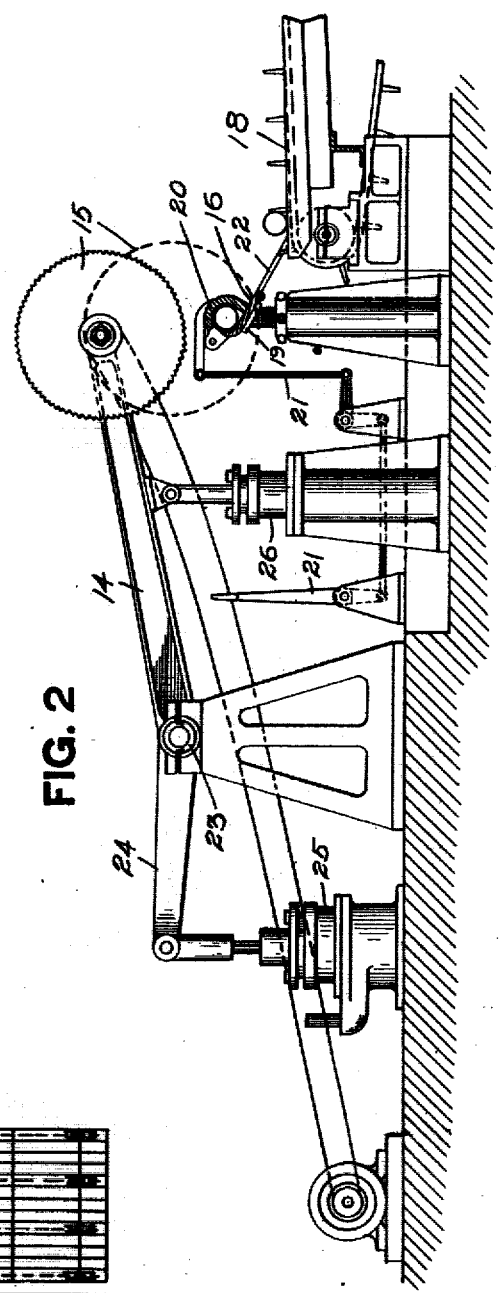
WITNESSES.
INVENTOR.

UNITED STATES PATENT OFFICE.

AUGUSTUS M. SAUNDERS, OF McKEESPORT, PENNSYLVANIA, ASSIGNOR TO NATIONAL TUBE CO., OF PITTSBURG, PENNSYLVANIA, A CORPORATION OF NEW JERSEY.

APPARATUS FOR THE MANUFACTURE OF PIPE.

No. 825,420.  Specification of Letters Patent.  Patented July 10, 1906.

Application filed January 23, 1904. Serial No. 190,325.

*To all whom it may concern:*

Be it known that I, AUGUSTUS M. SAUNDERS, a resident of McKeesport, in the county of Allegheny and State of Pennsylvania, have invented a new and useful Improvement in Apparatus for the Manufacture of Pipe; and I do hereby declare the following to be a full, clear, and exact description thereof.

My invention relates to the manufacture of welded tubing, and has special reference to the manufacture of long welded tubing and the finishing of the welded tubes in bringing them to suitable desired length.

In the manufacture of what is known as "double-length tubing" the custom has been to weld the tube in lengths of about thirty-six to thirty-eight (36 to 38) feet and then to pass the tube through finishing-rolls, the tube being transferred to what was known as the "sizing-trough," having back of and in line with it sizing-rolls, which bring the tube to proper size and feed it to a cross-roll trough leading to suitable cross-rolls, which by circular rolling bring it to true cylindrical shape and to place a saw for cutting the welded tube into sections, either in the sizing-trough or the cross-roll trough. In operating in this way delays were liable to occur, either in the severing of the blank or the feeding of the different severed tube-sections along the same course, and the object of the present invention is to overcome this difficulty.

To these ends the invention consists, generally stated, in the combination, with a welding-furnace and welding apparatus in front thereof, of finishing-rolls adapted to receive and finish the welded tube, a final receiving-trough back of and in line with the finishing-rolls, a saw adapted to pass across the final receiving-trough and sever the tube into sections, and a tube-receiver at the side of the final receiving-trough to receive the severed tube therefrom.

It also consists in certain other improvements hereinafter more fully set forth and claimed.

In the accompanying drawings, Figure 1 is a plan view of apparatus embodying the invention. Fig. 2 is an enlarged cross-section illustrating the preferred construction of the saw and final receiving-trough and the method of delivery from the same to the cooling-table.

In the accompanying drawings the furnace 2 is of any suitable construction, being preferably of a regenerative type and long enough to heat blanks of sufficient length to form welded tubes of double the ordinary standard length, the furnace being usually about forty to forty-five (40 to 45) feet in length. Mounted in front of the same is any suitable tube-welding apparatus 3, that illustrated in the drawings being the usual swinging draw-bench used for making butt-weld pipe, the bench being pivoted at the rear end 4 and having a continuously-running draw-chain 5, the tube-blanks to be welded being connected thereto by means of the tongs 6 and drawn through the bell-holder 6ª at the front end of the bench. At the side of this welding apparatus is the sizing-roll trough 7 in line with the sizing-rolls 8, which deliver the tube into the cross-roll trough 9, from which the tube passes through the cross-rolls 10. Back of the cross-rolls 10 is the final receiving or cooling-table trough 11, which is shown as formed in two sections 12 13, while located at one side of the same is the saw-frame 14, carrying the saw 15, adapted to pass across the trough 11 and between its sections 12 and 13. The two sections of the final receiving-trough 11 may be of any suitable form, so as to provide for inclosing and supporting the tube during cross-rolling and during the sawing operation and to provide for the quick delivery of the severed tube-sections from the trough to a suitable tube receiver or receivers at the side of the final receiving-trough, such as the cooling-tables 17 and 18.

To properly support the tube during cross-rolling, and especially when cross-rolling long lengths, it is necessary that the tube shall be entirely inclosed within the trough to prevent whipping action caused by the rotation of the long hot flexible tube. For this purpose and to hold the welded tube during the sawing thereof I prefer the construction shown in the enlarged view, Fig. 2, the upper face 16 of the body portion 19 of the trough being formed inclined and the trough provided with a hinged cover 20, pivoted at the outer and upper edge of the inclined body portion 19 and curved so as to extend down to the lower edge thereof and receive within the same the finished tube. By means of suitable lever connections 21 these top portions or trough-covers 20 may be raised, the trough so opening in a downward direction and providing for the passage of the severed tube-sections over the inclined skids 22 onto the continuous chain cooling-tables. As it is desirable that the saw shall be under complete control, it is preferably mounted the way illustrated. The saw-frame or swinging arm 14 is mounted in a stationary bearing 23 and has an extension or lever 24 connected with the piston of a hydraulic ram 25. To support or balance the saw and frame, an additional ram 26 is connected to the frame between the saw and stationary bearing, and the two rams may be operated in unison, if desired.

In the employment of the above invention the tube-blanks, either in plate or strip form or previously bent into U or tubular skelp form, are preferably fed through the rear end of the furnace, and when the invention is employed in the manufacture of butt-weld tubing, being preferably fed into final heating position, and as their edges are brought to proper welding heat, the blanks being grasped by suitable tongs 6, the welding-bell thrown over the same, the tongs connected to the draw-chain of the welding apparatus, and the blanks thus drawn through the welding-bells, which are caught in the bell-holder 6ª. The tongs are then disengaged from the welded tube, which is fed to the sizing-rolls, for example, being passed sidewise over suitable skids into the trough 7 and then fed through the sizing-rolls 8 into the cross-roll trough 9 and through the cross-rolls 10 into the final receiving or cooling-table trough 11. In the manufacture of double-length tubing it is found that with some of the larger sizes of pipe the pipe can be cross-rolled before it is cut into lengths, and in passing in the course above described the pipe can be carried quickly and without delay through both the sizing-rolls and the cross-rolls, the delays or accidents liable to occur where the blanks have to be stopped in their course and cut to lengths and then fed successively to the finishing-rolls being thus prevented, the blanks passing in straight-away course through both the sizing-rolls and the cross-rolls. As the tube passes through the cross-rolls it enters the cross-roll trough, which entirely incloses the same and supports it during the cross-rolling action, as above described. As soon as the tube is discharged from the cross-rolls the saw 15 is caused to pass across the same and sever the tube into sections, the final receiving-trough thus supporting the blank not only during the cross-rolling, but inclosing and holding it firmly during the sawing operation. As soon as the tube is thus severed into sections it is discharged in any suitable way from the final receiving-trough. For example, by means of the levers 21 the covers 20 of the two trough-sections 12 and 13 are raised, the troughs thus opening in a downward direction, so that the tube-section will roll down the inclined bottom portions of the trough-sections and roll over the skids 22 onto the cooling-tables. The sawing of the tube takes place after its rolling is completed, and the tube is quickly discharged by a side movement from the final receiving-trough as soon as it is cut into sections, and the liability of delays incident to sawing the tube and then feeding the different sections thereof successively to either sizing-rolls or cross-rolls, or both, is avoided. The difficulties heretofore experienced in the manufacture of double-length tubing are thus overcome, while I am enabled to finish the entire output of the furnace on a single set of sizing-rolls and cross-rolls.

What I claim is—

1. In apparatus for the manufacture of multiple-length tubing, the combination of finishing-rolls adapted to receive and finish the tube, a closed final receiving-trough back of and in line with the finishing-rolls, and a saw adapted to pass across the final receiving-trough and cut the tube into sections, the final receiving-trough inclosing and supporting the tube during finishing and sawing.

2. In apparatus for the manufacture of multiple-length tubing, the combination of finishing-rolls adapted to receive and finish the tube, a final receiving-trough back of and in line with the finishing-rolls, said trough having an inclined bottom portion and a cover hinged at the upper and outer edge thereof, a tube-receiver at the side of said final receiving-trough, and a saw adapted to pass across the final receiving-trough and cut the tube into sections.

In testimony whereof I, the said AUGUSTUS M. SAUNDERS, have hereunto set my hand.

AUGUSTUS M. SAUNDERS.

Witnesses:
JAMES I. KAY,
ROBERT C. TOTTEN.